(No Model.)

T. C. HENDEY.
CALIPERS.

No. 346,915. Patented Aug. 10, 1886.

Witnesses:
C. C. Perkins.
C. E. Ruggles.

Inventor,
Thomas C. Hendey
By H. M. Wooster
Atty.

UNITED STATES PATENT OFFICE.

THOMAS C. HENDEY, OF TORRINGTON, CONNECTICUT.

CALIPERS.

SPECIFICATION forming part of Letters Patent No. 346,915, dated August 10, 1886.

Application filed March 22, 1886. Serial No. 196,122. (No model.)

*To all whom it may concern:*

Be it known that I, THOMAS C. HENDEY, a citizen of the United States, residing at Torrington, in the county of Litchfield and State of Connecticut, have invented certain new and useful Improvements in Calipers; and I do hereby declare the following to be a full, clear, and exact description of the invention, such as will enable others skilled in the art to which it appertains to make and use the same.

My invention has for its object to produce calipers of great range, which shall be durable and economical in construction, and which may be very quickly and accurately adjusted to the minutest fraction of an inch. Heretofore two classes of calipers have been in general use. One style consists of a pair of curved legs pivoted together so tightly as to require considerable power to move them. In use these are adjusted as closely as possible by hand, and an accurate adjustment is secured by knocking the legs until they assume the exact position desired. The other style is operated by a nut upon a threaded rod which passes through one leg and is pivoted to the other, spring-jaws being sometimes used, or an independent spring, to force the jaws apart. The greatest objection to both of these calipers is the loss of time in effecting an accurate adjustment. In the latter class, in changing from a large to a small measurement, or vice versa, the entire movement of the legs is gained by turning the nut upon the threaded rod.

In order to overcome the objections to calipers now in use, and to provide a simple, quick-acting, and durable device perfectly adapted to all classes of work, I have devised the novel construction of which the following description, in connection with the accompanying drawings, is a specification, numbers being used to indicate the several parts of the device.

Figure 1:
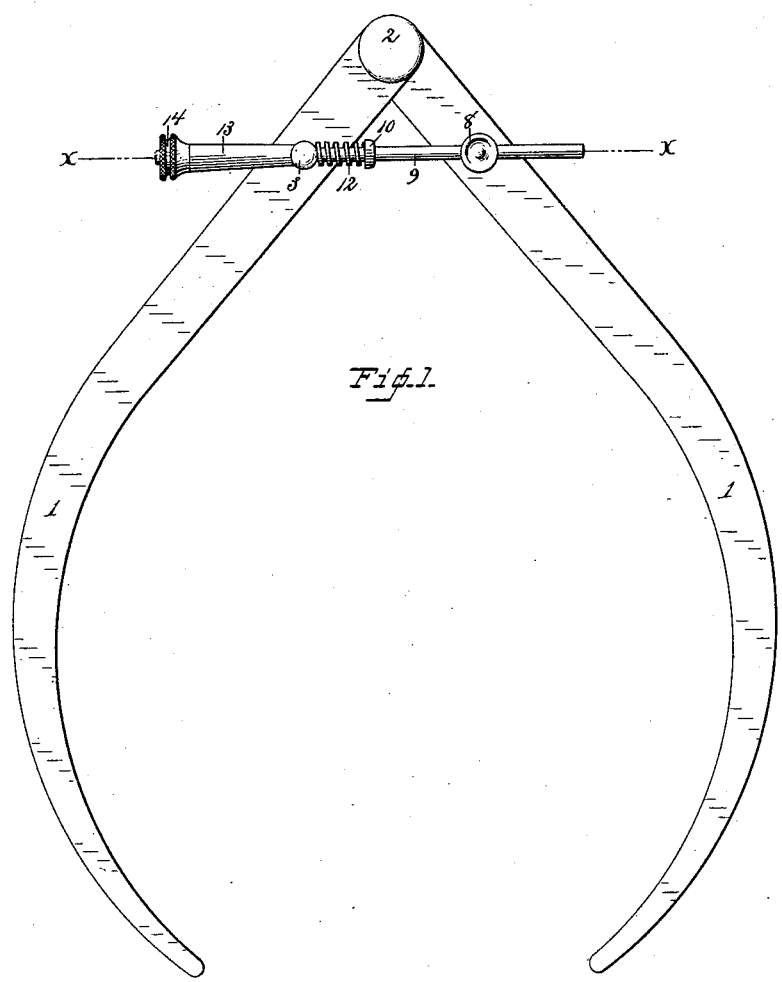
Figure 2:
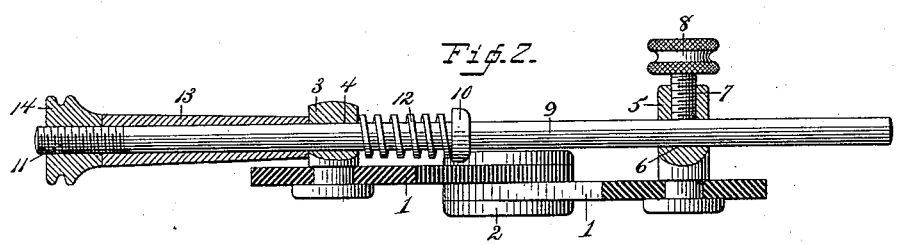

Figure 1 is an elevation of the device complete, and Fig. 2 an enlarged sectional view on the line *x x* in Fig. 1.

1 indicates the legs, which are of ordinary construction, and are pivoted together in the usual manner, as at 2, but are left loose enough to turn freely.

3 indicates a post in the left leg, which is free to turn therein, and is provided with a central opening, 4, which passes transversely through it. 5 indicates a similar post in the right leg, which is provided with a similar transverse opening, 6; and with a screw-threaded longitudinal opening, 7, which extends from the end of the post down to the transverse opening.

8 is a set-screw in the longitudinal opening, the purpose of which will presently be explained.

9 is a rod which is adapted to slide freely in the transverse openings in the loose or turning posts. This rod is provided with a shoulder, 10, about midway of its length, and at one end—the left—as shown in the drawings, with a threaded portion, 11.

12 is a coiled spring surrounding the rod, one end of which bears against shoulder 10, the other against post 3.

13 is a sleeve upon the rod outside of post 3, which is elongated sufficiently to permit the calipers to be opened to their widest extent, and 14 is a nut engaging the screw-thread at the end of the rod. The sleeve is of course loose upon the rod, which at all times slides freely through post 3, and is adapted to slide freely through post 5, or to be locked therein by tightening set-screw 8.

I have shown my invention as applied to outside calipers. It will be apparent, however, that it is equally applicable without change to inside calipers or to dividers. In use the legs are approximately adjusted and set-screw 8 is tightened against the rod. The legs may then be adjusted with the minutest precision by turning nut 14 at the outer end of the rod. If the legs are to be closed together, the nut is turned inward upon the rod, which draws the legs together, the spring being compressed between the shoulder and post 3. Should it be desired to open the legs slightly, the nut is turned outward upon the rod, the spring at the same time expanding and holding post 3 against the sleeve and the sleeve against the nut. Slight changes in adjustment may be made at any time by the set-screw alone; but when very much of a change is required set-screw 8 is loosened, which permits the rod to slide freely through post 5. When the desired adjustment has been approximately secured, set-screw 8 is again tightened up, which locks the rod in post 5.

It will of course be understood that the details of construction may be varied within reasonable limits without departing from the spirit of my invention.

I claim—

In calipers, the legs pivoted together loosely at their bases, and having posts within the pivotal point which are free to turn, and are provided with openings, in combination with a rod which slides in said openings, and is provided with a shoulder, 10, and a threaded portion at one end, a spring adapted to bear against the shoulder and one of the posts, a set-screw in the other post, which engages the rod, a sleeve on said rod, and a nut engaging the thread and bearing against the sleeve, as and for the purpose set forth.

In testimony whereof I affix my signature in presence of two witnesses.

THOMAS C. HENDEY.

Witnesses:
JOHN A. PARSONS,
O. R. LUTHER.